US011865464B2

(12) United States Patent
Anand et al.

(10) Patent No.: US 11,865,464 B2
(45) Date of Patent: *Jan. 9, 2024

(54) SYSTEMS AND METHODS TO ENHANCE AND DEVELOP NEW GAMES AND ACTIVITIES BASED ON LOGIC PUZZLES

(71) Applicants: Indu M. Anand, Chelmsford, MA (US); Ishan Anand, Sammamish, WA (US); Pranav Anand, Santa Cruz, CA (US)

(72) Inventors: Indu M. Anand, Chelmsford, MA (US); Ishan Anand, Sammamish, WA (US); Pranav Anand, Santa Cruz, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 17/168,139

(22) Filed: Feb. 4, 2021

(65) Prior Publication Data
US 2021/0197070 A1    Jul. 1, 2021

Related U.S. Application Data

(63) Continuation-in-part of application No. 15/985,723, filed on May 22, 2018, now Pat. No. 10,933,323.
(Continued)

(51) Int. Cl.
*A63F 3/04*     (2006.01)
*A63F 13/46*    (2014.01)
(Continued)

(52) U.S. Cl.
CPC .......... *A63F 3/0421* (2013.01); *A63F 3/0415* (2013.01); *A63F 13/46* (2014.09);
(Continued)

(58) Field of Classification Search
CPC .......... A63F 13/50; A63F 13/46; A63F 13/33; A63F 13/798; A63F 3/0421; A63F 3/0415; A63F 2003/0418; A63F 2300/305
See application file for complete search history.

(56) References Cited

U.S. PATENT DOCUMENTS

| 4,512,584 A | 4/1985 | Propsom |
| 10,933,323 B2 | 3/2021 | Anand et al. |

(Continued)

FOREIGN PATENT DOCUMENTS

| JP | 2014133071 A | 7/2014 |
| WO | WO 2011/053639 A1 | 5/2011 |

OTHER PUBLICATIONS

International Search Report and Written Opinion dated May 19, 2022, in connection with International Application No. PCT/US2022/015120.

(Continued)

*Primary Examiner* — Thomas H Henry
(74) *Attorney, Agent, or Firm* — PIERCE ATWOOD LLP

(57) ABSTRACT

Methods and apparatus of associating by a computerized system, labels with the order of execution of steps of solving a puzzle, game or activity, for one or more parts of one or more solution-paths for the puzzle, game or activity are described. Execution of the puzzle solution and also the particular sequence of steps in the solution paths are used to evaluate a relative efficiency of one sequence of steps over the other sequence. By quantifying efficiency of the solution path it becomes possible to logically and objectively compare the efficiency of two or more solutions or completions of the puzzle, game or activity.

24 Claims, 6 Drawing Sheets

Related U.S. Application Data which is a continuation-in-part of application No. 15/233,798, filed on Aug. 10, 2016, now abandoned, which is a continuation-in-part of application No. 13/843,844, filed on Mar. 15, 2013, now abandoned.

(60) Provisional application No. 61/794,208, filed on Mar. 15, 2013, provisional application No. 61/799,975, filed on Mar. 15, 2013.

(51) Int. Cl.
*A63F 13/5375* (2014.01)
*A63F 13/798* (2014.01)

(52) U.S. Cl.
CPC ........ *A63F 13/5375* (2014.09); *A63F 13/798* (2014.09); *A63F 2003/0418* (2013.01); *A63F 2300/305* (2013.01)

(56) References Cited

U.S. PATENT DOCUMENTS

| | | |
|---|---|---|
| 2005/0032565 A1 | 2/2005 | Cheng et al. |
| 2007/0287518 A1 | 12/2007 | Nagel et al. |
| 2008/0004096 A1 | 1/2008 | Graepel et al. |
| 2009/0048010 A1 | 2/2009 | Kroeckel et al. |
| 2009/0270155 A1 | 10/2009 | Glass et al. |
| 2011/0018195 A1 | 1/2011 | Downs, III et al. |
| 2014/0274244 A1 | 9/2014 | Anand et al. |
| 2017/0036118 A1 | 2/2017 | Anand et al. |
| 2019/0009174 A1 | 1/2019 | Anand et al. |

OTHER PUBLICATIONS

International Search Report and Written Opinion dated Sep. 15, 2014 in connection with International Application No. PCT/US2014/028454.

International Preliminary Report on Patentability dated Sep. 24, 2015 in connection with International Application No. PCT/US2014/028454.

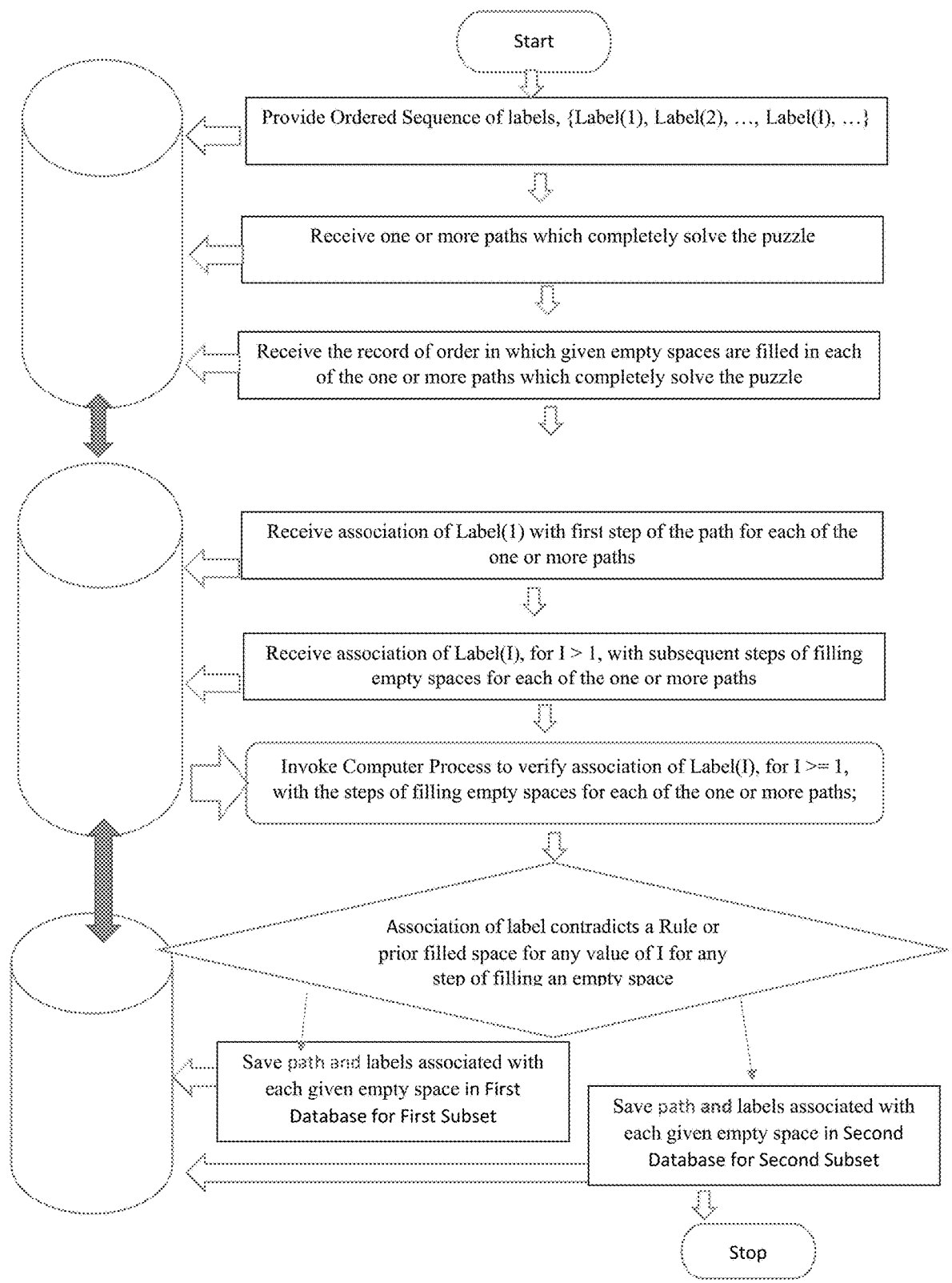
FIG. 2. Basic Flow – Label association with Steps of a solution

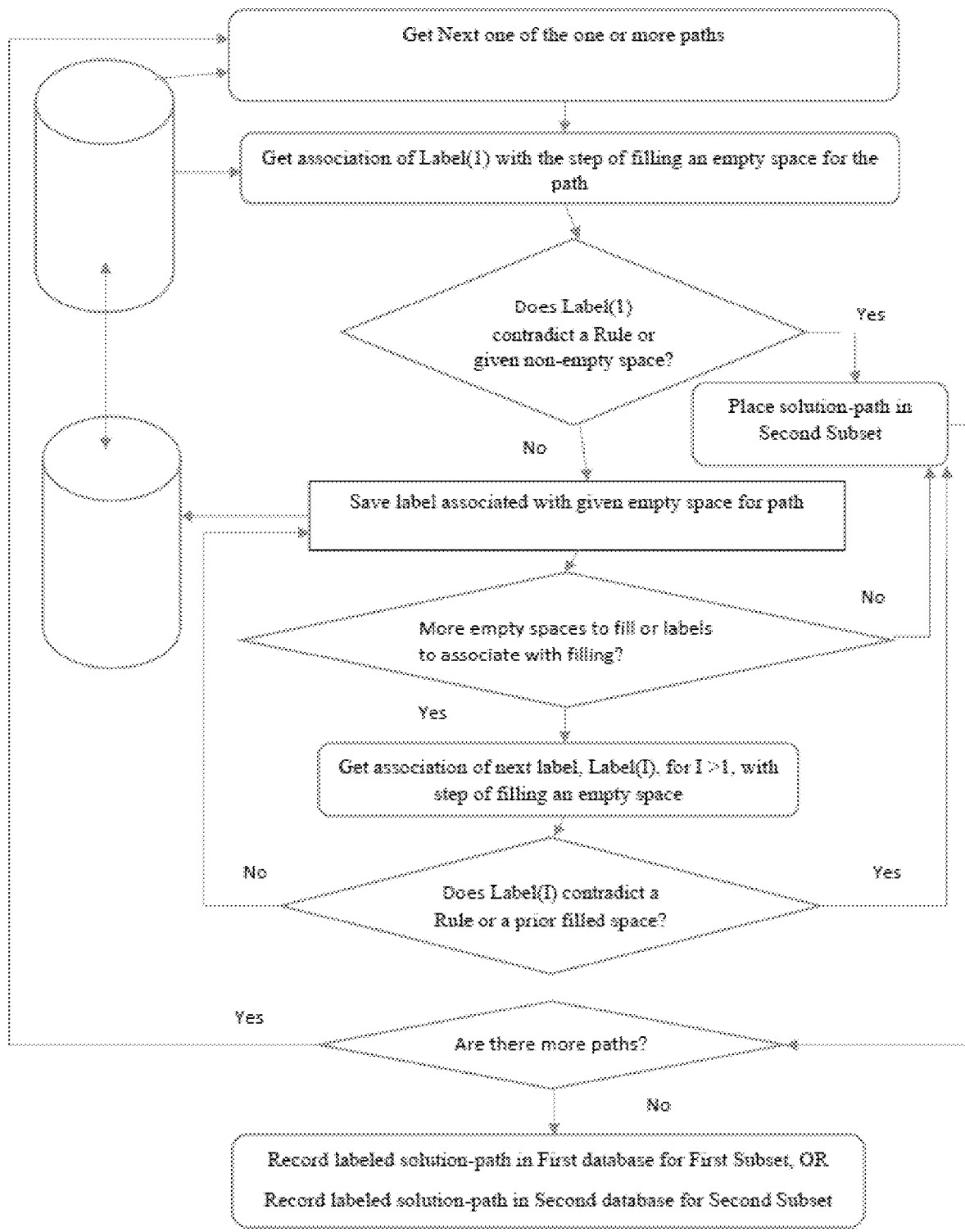
FIG. 3. Computerized Verification of Solution-Paths and Label Assignments

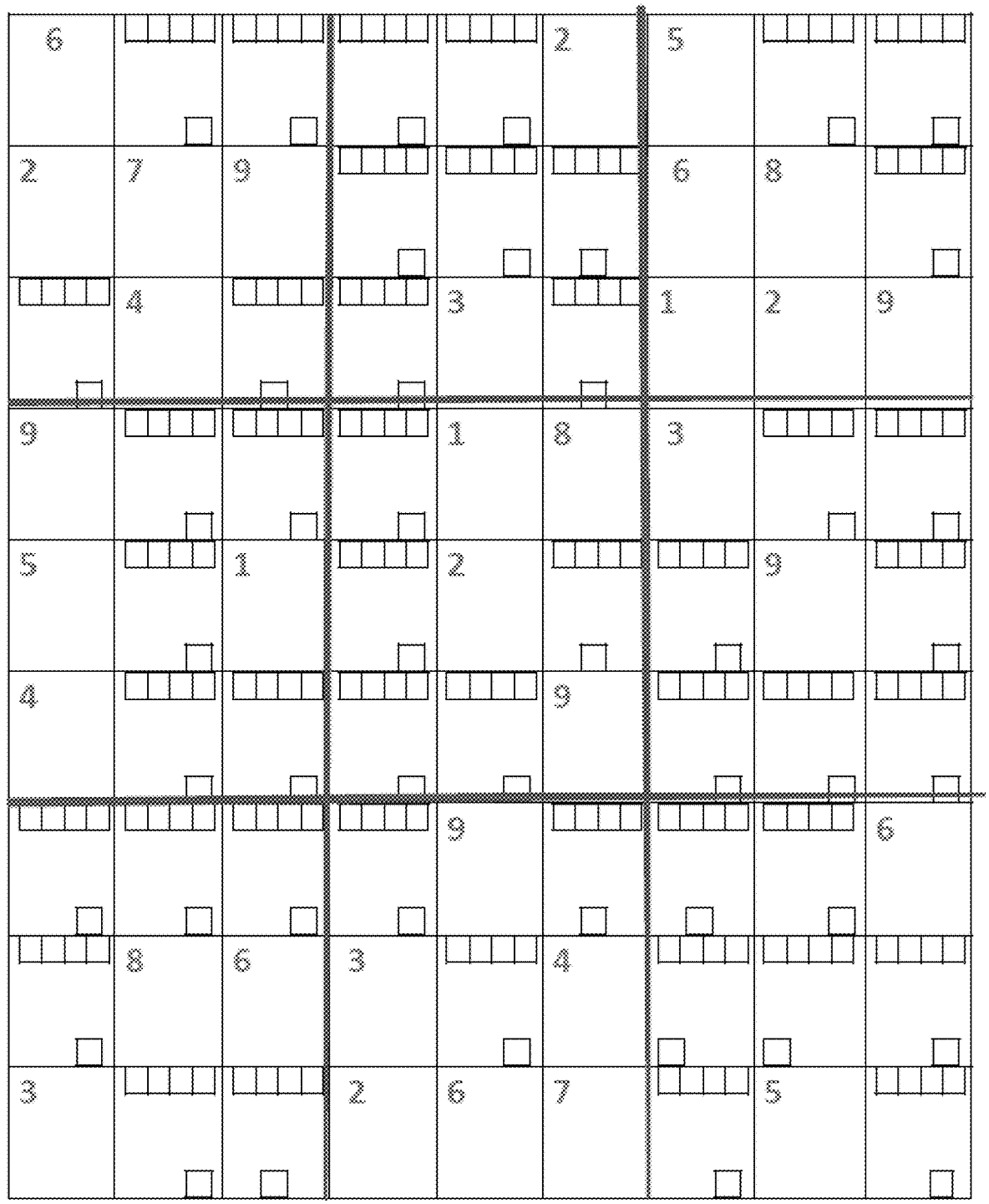
FIG. 4. Sample layout of a Sudoku puzzle with 34 cells given filled, and 47 empty cells

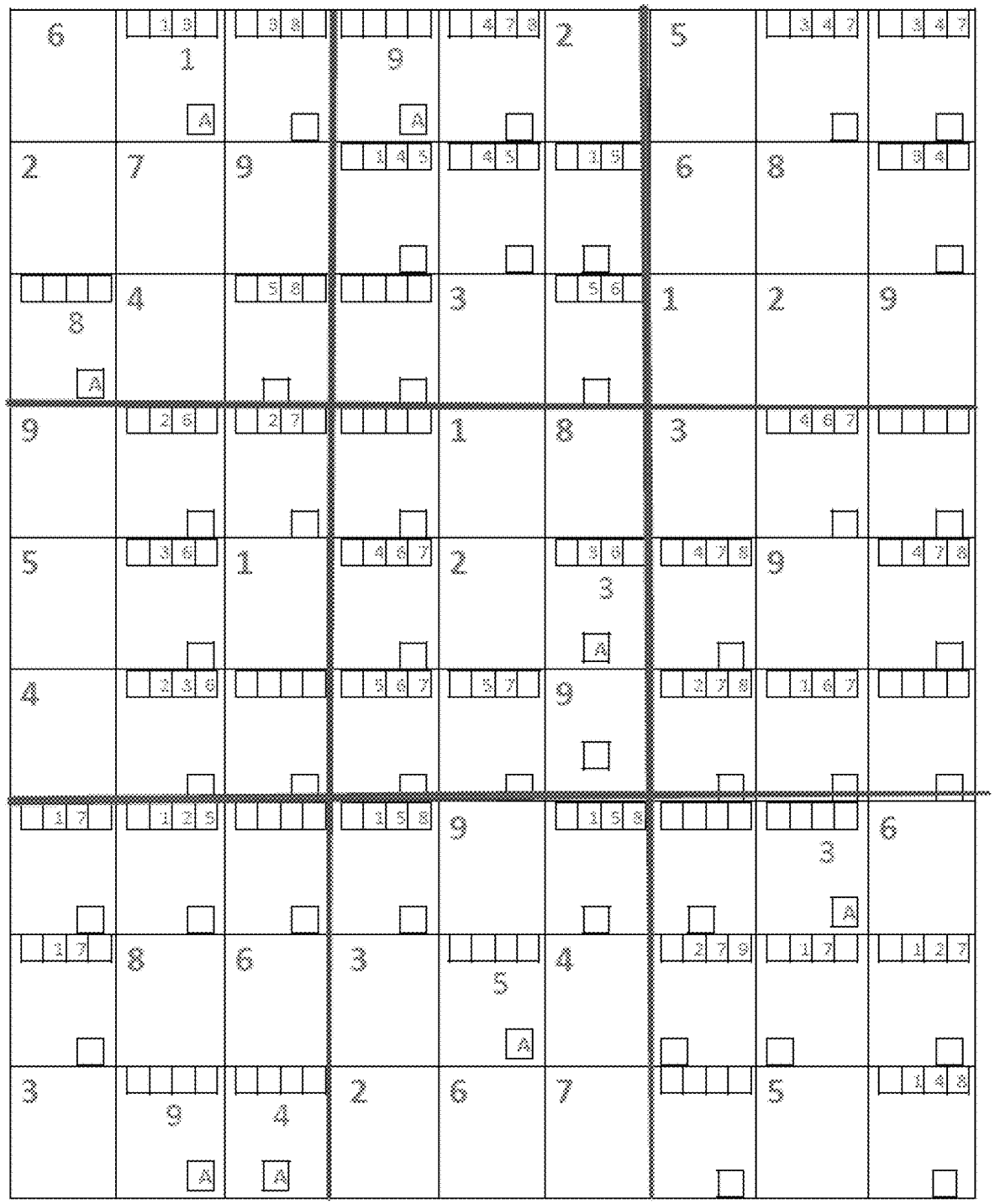
FIG. 5. Puzzle of FIG. 4, shows partial lists (of up to 3 characters) for filling cells by trial-and-error, and labels "A"

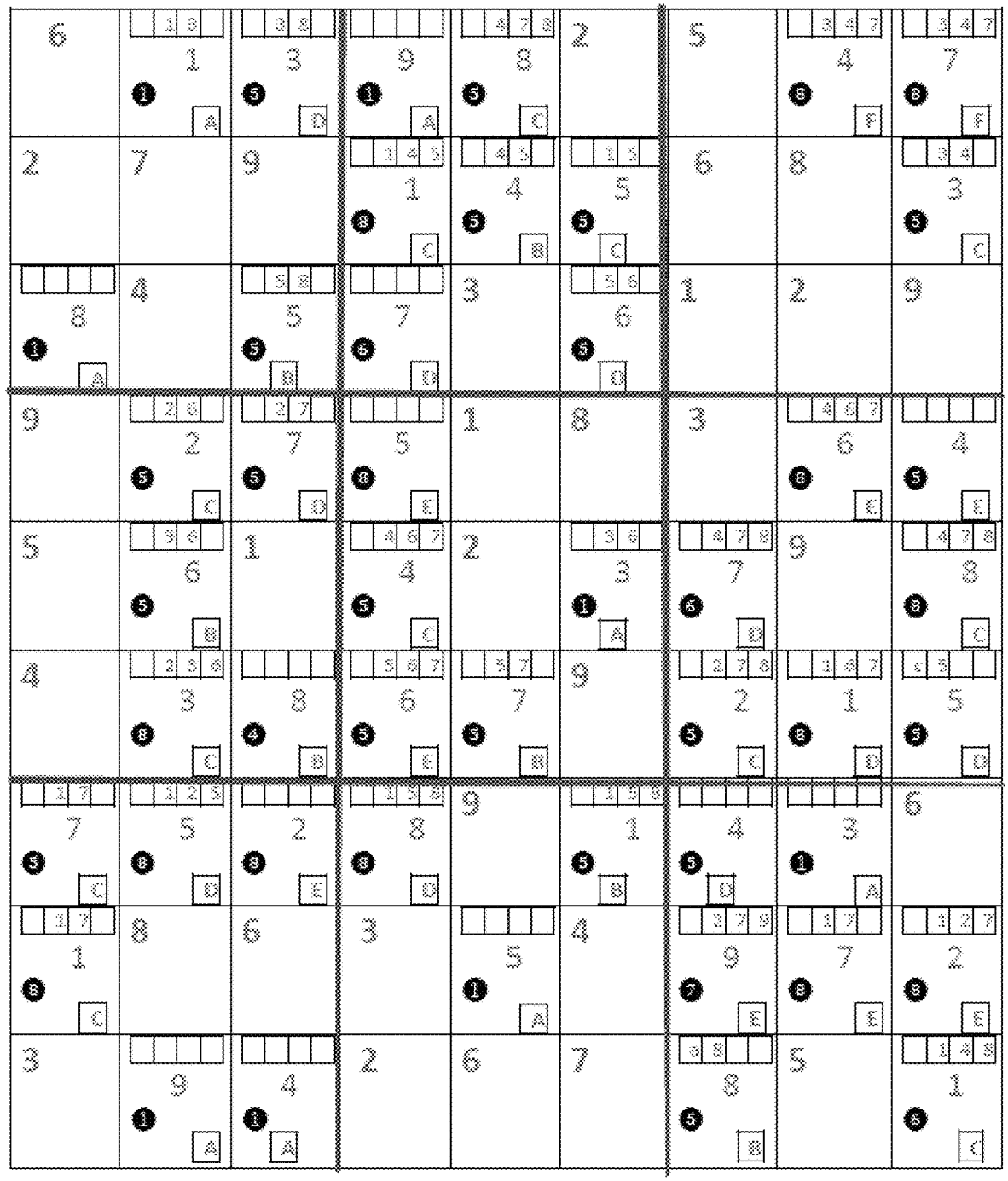
FIG. 6. A solution of Puzzle of FIG. 4, shows numbers, Lists of possible numbers and labels in cells filled, along with logical reason icons in black circles

SYSTEMS AND METHODS TO ENHANCE AND DEVELOP NEW GAMES AND ACTIVITIES BASED ON LOGIC PUZZLES

CROSS-REFERENCE TO RELATED APPLICATIONS

This Application is a Continuation-in-part of U.S. application Ser. No. 15/985,723, filed May 22, 2018, entitled "SYSTEMS AND METHODS TO ENHANCE AND DEVELOP NEW GAMES AND ACTIVITIES BASED ON LOGIC PUZZLES", which is a Continuation-in-part of U.S. application Ser. No. 15/233,798, filed Aug. 10, 2016, entitled "ENHANCING TECHNIQUES AND SYSTEMS FOR LOGICAL GAMES, ACTIVITIES AND PUZZLES", which is a Continuation-in-part of U.S. application Ser. No. 13/843,844, filed Mar. 15, 2013, entitled "ENHANCING TECHNIQUES AND SYSTEMS FOR LOGICAL GAMES, ACTIVITIES AND PUZZLES," which claims priority under 35 U.S.C. § 119(e) of U.S. Application Ser. No. 61/794,208, filed Mar. 15, 2013, entitled "ENHANCING TECHNIQUES AND SYSTEMS FOR LOGICAL GAMES, ACTIVITIES AND PUZZLES," and U.S. Application Ser. No. 61/799,975, filed Mar. 15, 2013, entitled "NOVEL APPLICATIONS OF LOGICAL GAMES, ACTIVITIES AND PUZZLES," the entire contents of each of which is incorporated by reference herein.

FIELD OF INVENTION

The present disclosure pertains to the particular field of logic puzzles, as well as to the games and activities involving skill and logic which can be modeled by logic puzzles, which is a special focus of this application.

BACKGROUND

Logic games, games of skill and strategy, puzzles and similar activities have been used by many cultures for millennia for social and educational purposes, and for entertainment. In addition to puzzles that are of particular interest, many games and activities are in the class envisioned for application of the methods and system disclosed by the present invention, and a reference herein to "activity" subsumes games and puzzles, unless otherwise excluded. Certain variations of physical activities and team sports may also belong in the intended class.

The games and activities in the intended class may be collaborative or competitive, and are characterized by subordinate activities, or "steps", wherein an actor or player may proceed to a "next step" or one of the several possible "next steps," making the decision based on knowledge of the activity, states of the activity up to the moment of taking the step, general knowledge of other players and the milieu, the player's skill and logical "reasonableness" of the next step or steps, and other such factors. The factor of skill and logical reasonableness distinguishes this class of problems from games and activities of pure chance, although the element of chance may be included as an additional decision factor for the intended class of activities.

Games and puzzles involving skill and logic are an intended sub-class. Crossword, word scrambles and numeric puzzles of various types are a category of particular interest. Many such activities are highly popular, and routinely published in various media, including print and the Internet. The number/logic puzzle, "Sudoku," is the best-known example of the class of logic puzzles to which the methods of this invention would apply. However, the methods with suitable adaptation are applicable to a much wider class of logic puzzles and other activities.

The most common version of Sudoku puzzle consists of a grid of 81 cells in 9 rows and 9 columns, overlaid with 9 blocks, each block consisting of 9 neighboring of cells (squares) arranged in a 3-by-3 grid, with numbers in some cells but most cells left blank. The goal for this typical case is to fill in the blank/or empty squares/spaces or cells with numbers from 1 to 9 so that none of the numbers repeats in any one row or column, or within the 3-by-3 block containing the cell.

The popularity of Sudoku has spawned a wide variety of new puzzles, such as, using different sets of characters, e.g., letters instead of numbers, or grids of different sizes, or different layouts for the spaces, or an irregular grid. The puzzle called KenKen shares some rules with Sudoku, but whereas Sudoku does not require knowledge of any mathematical operation, KenKen's rules rely on arithmetic calculations to fill the blank cells.

These and other variations are within the class of puzzles that are amenable to, and contemplated within, the methods of some embodiments of the invention. Using the details provided herein for Sudoku, the methods may be adapted for these and such other variations.

The discussion and the description herein focus, in particular, on logic puzzles, games and activities which end in unique solution or finish, and propose novel methods to distinguish solutions by different players for such activities.

SUMMARY

The present invention poses, and answers by presenting illustrative embodiments, the following twin problems related to such activities which often occur in the real world:

(1) How can we distinguish between two or more completions, or attempts to complete, of the activities, games or puzzles where the end or the final solution is unique? and, (2) How can we select participants in competitive or collaborative activities, games or puzzles for ranking or rewarding them when the endings or the final solutions are undistinguished?

At present, the issues surrounding the second problem are addressed by competitions for solving Sudoku and other logic puzzles by rewarding participants who solve the puzzle(s) in the shortest spans of time, an approach limited in many ways, and one that does not necessarily reward the most logical or insightful solution of a logic puzzle.

The answer presented by some embodiments of this invention is to logically distinguish the solutions to the puzzles, games and activities in the class of interest by the order of execution of the steps leading to a completion of an activity. To help ease the explanation, this description uses concrete examples of puzzles with unique solutions; a similar approach may be adapted for activities which can be modeled by such puzzles.

A method in accordance with some embodiments of this invention works by considering not only the execution of each step of the activity or the problem, but also the exact sequence of steps in a solution or completion of the activity. Two identical finishes of an activity may be reached through two distinct sequences of steps, and yet one sequence may be "preferable" over the other, in part based on the relative efficiency of one sequence of steps over the other sequence. This disclosure relies on the observation that if it is possible to quantify "efficiency" of the exact approach or sequential order of execution of a puzzle, game or activity, then we can logically and objectively compare the efficiency of two or more solutions or completions of the puzzle, game or activity.

This patent application and its predecessors show how to employ the device of associating labels from a known sequence to track the order of execution of the steps of solving a puzzle, together with the methods to "quantify" distinctions in logical order of execution of the steps. Thus, the inherent, measurable logical difference between two or more sequences of solution steps can be captured in a practical, meaningful and time-independent manner, undergirded by a codified version of the following assumption: An "over-all shorter sequence" of steps for solving a puzzle is more efficient than a solution requiring a longer sequence of steps, where the phrase "over-all shorter sequence" is clarified within the description below.

Many scenarios, where the methods of the present invention are applicable, involve comparing distinct attempts to complete an activity or solve a puzzle; or they may involve comparing parts or segments, or other similar descriptors, of the attempts. To facilitate such comparisons, a quantitative construct disclosed in the prior related applications is the algorithmically computed "Measure of Efficiency" of a solution or performance that takes into account the execution of the process from the start to the finish for a given game, puzzle or activity, coupled with information of the actual sequence of steps executed between start and finish for the (specific) solution or performance.

The "Measure of Efficiency," is a quantitative descriptor for a sequence or chain of steps for an activity, game or puzzle of interest, that is used to computably reckon the advance of steps in the chain. Therefore, its computation includes some variation of the following acts: (1) providing an algorithm or mechanism to track the sequence in which the steps of the activity are carried out, (typically) towards the goal of completing the activity; (2) associating, with each step of the activity an indicator to annotate the point in the sequence at which the step is carried out; (3) associating, with each step of the activity, a quantity, e.g. a real number, by using the indicator; and (4) combining the quantities associated with the steps of the sequence into one numerical measure by a suitable formula.

A comparison of two or more sequences of steps comprises two additional steps: (5) providing the measures of efficiency for each of the two or more sequences of the steps; and, (6) comparing the distinct sequences of steps by their computed, respective numerical measures of efficiency.

Any preferential selections from the two or more sequences can then be made by the order induced by a comparison of the numerical measures so computed.

A flowchart of a process for performing an efficiency calculation for an embodiment of the present invention is shown in FIG. 1, which is identical to FIG. 5 of the parent application. The detailed description of FIG. 1 is not repeated herein for simplicity. Employing the device of labels facilitates computation of the measure of efficiency.

It is emphasized that the device of tracking the order of execution of the steps of solving a puzzle by associating labels from a known sequence is available for not only an entire puzzle, but also for a part of an attempt at solving on the path to a solution, i.e., a solution-path.

For a puzzle, such as Sudoku, a solution-path is made up of a sequence of fillings of empty spaces of the puzzle with characters from a given set, one character in one space. A solution-path may contain one or more connected chains of steps (e.g., the filling of spaces), where a step affects the subsequent steps; and, a solution-path may itself be part of a longer solution-path. Thus conceptually, filling of a single space may be regarded as a "one-step solution-path" or a part of a longer solution-path, from the perspective of an attempt to solve the puzzle.

Once labels are associated with the filling of spaces along any one solution-path, it is possible to "tag" the spaces of the puzzle with those labels for the specific solution-path; and thereafter, other quantities based on labeling can be defined, computed and compared similarly to the Measure of Efficiency computation for any specific solution-path.

To the extent that an activity can be modeled by a logic puzzle, a computation algorithm for Measure of Efficiency may be adapted for it as well.

The "efficiency" of the activity in this sense does not depend on time or a "race to the finish line," but correlates to the "complexity" of the puzzle or the activity. It is mediated through the tracking mechanisms of the order in which steps of the solution are, or expected to be, executed. The relationship between "efficiency" and "complexity" is discussed further in the Detailed Description below.

As mentioned, the approach of some embodiments of the invention has many real-world applications. For example, its various embodiments make possible, inter alia: providing opportunities for skill-based, on-line wagering games and activities, where rewards may be earned, for entertainment and to promote an interest in numbers and mathematical relationships; providing the artists creative new ways to capture and express the structure of a puzzle; generating, further puzzles and activities from known puzzles; providing hints to a novice player to solve a puzzle without giving away the entire solution; and, the possibility of creating puzzles with hints that have specific utility in education.

In the parent application of the present patent application, one approach to generating hints for players based on the solutions provided by other players was described in detail. The present disclosure expands its use for hints, and provides the details for other examples of utility, among them, for skill-based, on-line wagering games and activities, where rewards may be earned, for entertainment and to engender an interest in numbers and mathematical and logical relationships. These activities generally involve comparison and ranking of objects, and some form of competition. Therefore, comparison and ranking are addressed in detail in this description.

For specific examples where needed, much of the description of methods and systems given here uses Sudoku, the best-known and especially instructive example of the class of logic puzzles, that is typically laid out as a grid of 81 cells in 9 rows and 9 columns, overlaid with 9 blocks of 9 neighboring cells, each a 3-by-3 grid. A player attempts to fill the blank spaces/cells with numbers from 1 to 9, without repeating a number in any one row, column, or block containing the cell.

In the currently held competitions for solving Sudoku, winner(s) are picked based on the time to arrive at the correct unique solution. Time is easy to employ as the determinant for selection, but is also the only measurable determinant available at present. The method of present invention in some of its embodiments, on the other hand, proposes a measurable quantity to reward the logical superiority of one solution over another. Thus, it makes possible to pick winners in a competition for a logical activity or puzzle, such as Sudoku, based on the quantitative measures of logical "superiority." Time may be used as an additional parameter for the selection.

A reasonable definition of the logical superiority of one solution of the puzzle over another solution would relate to the economy of the effort and compare how readily from a "start" the spaces get filled in one solution versus the other. This approach, regards a well-reasoned, direct solution as superior to a "meandering" one, with more steps to accomplish the same goal. For example, completing a Sudoku puzzle by logical argument is better than a "brute-force" trial-and-error approach of trying every number in every empty cell to settle on the one correct number for the cell.

A comparison of logical "superiority" between two solutions of a given puzzle can be made based on their relative efficiency, i.e., by computing the measure of efficiency for each solution, then comparing the two computed numbers. Labels associated with the steps of solving a puzzle, as described in detail herein, allow computation of such an "efficiency" measure, which may open up many possibilities for generating further games, puzzles and activities.

These further real-life applications contemplated by using the core method include: determining the efficiency and relative proficiency of two or more players in solving the puzzle; providing either a priori or dynamic hints in various forms to aid a player in attempting completion of the puzzle or activity; running internet-based competitions or collaborative meet ups to solve puzzles or carry out logic-based activities.

The vision also includes: to provide creative expression of the puzzle solutions; to display the solution or solutions for teaching or entertainment of viewers or spectators, including the viewers/spectators on computerized communication networks, or audiences of television or live shows; publication of games, activities and puzzles in various forms of media suitable for mass distribution, such as film, video, CD, DVD and other similar media now in existence or available in the future.

Associating labels with the steps of solving a puzzle or carrying out an activity modeled by solving a puzzle by the method and system of this invention allows measurement of other related descriptors. For example, Measure of Efficiency or a similar measure can be computed for a solution or part of a solution, such as, a solution-path, or a sequence of steps of a puzzle, or part performance of an activity. It is possible also to compute such a measure for a labeled segment of a puzzle, e.g., a row, column or block of Sudoku puzzle. The frequencies of occurrence of specific labels or their relative positions in the puzzle solution(s) are further examples which lend themselves to comparison and competition by the methods disclosed herein. Examples and embodiments of these activities are described in detail herein below.

DESCRIPTION OF DRAWINGS

FIG. 2 is a flowchart of a process for associating labels with steps of solution, in accordance with some embodiments;

FIG. 3 exemplifies a computerized verification of solution-paths and label assignments, in accordance with some embodiments;

FIG. 4 is an example of the layout of a Sudoku puzzle;

FIG. 5 is a partial solution of the puzzle of FIG. 4, displaying label associations up to A, and one example (filling one specific space) of determining characters and labels for filling spaces by trial and error, in accordance with some embodiments; and FIG. 6 is a completed solution of the puzzle of FIG. 4, with example of displaying labels and the logical reasons for the determination of characters and labels.

DETAILED DESCRIPTION

Figure 1:
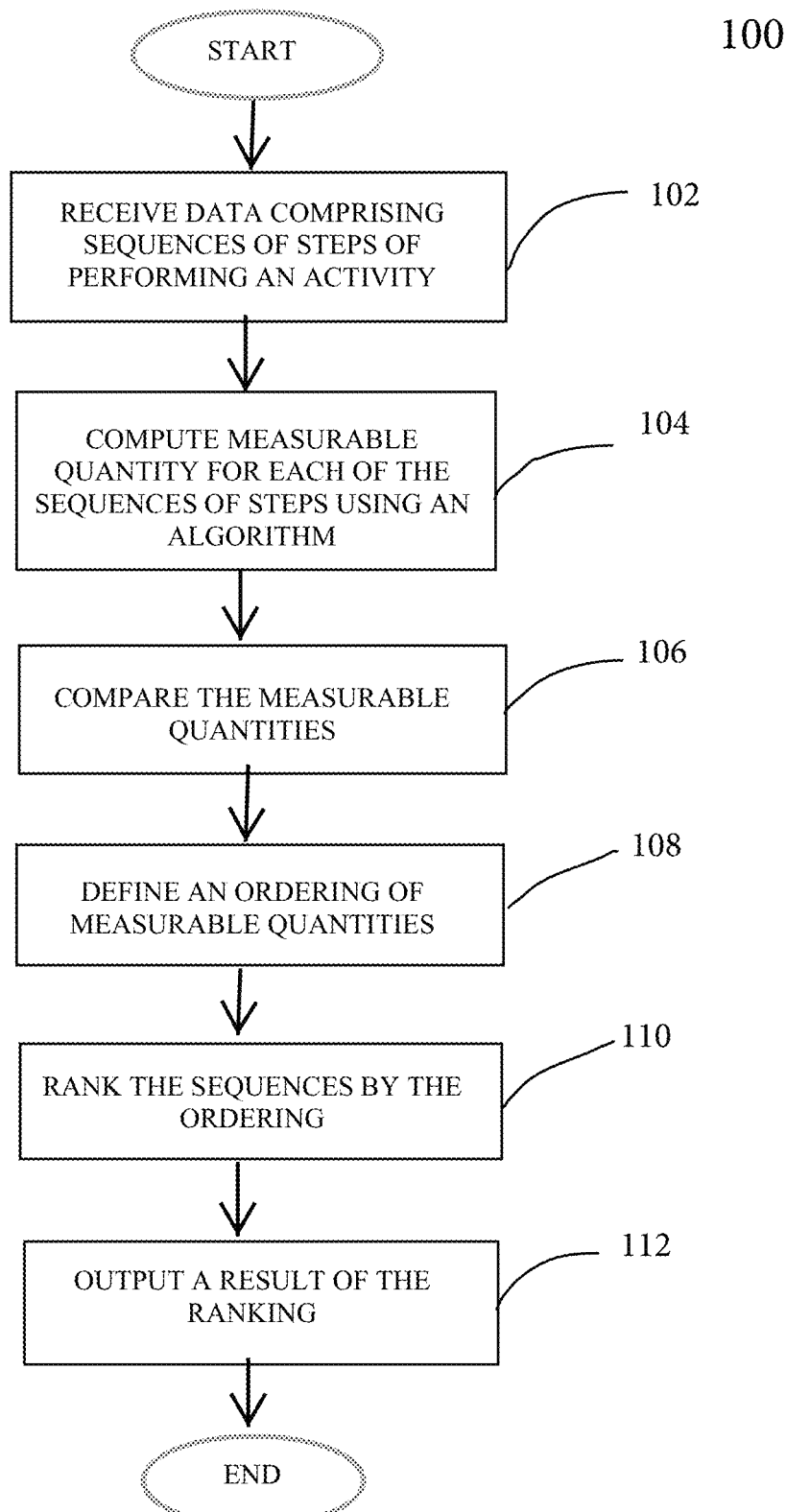
FIG. 1 is a flowchart of a process for ranking sequences of steps of a performance of an activity, in accordance with some embodiments.

The inventors have recognized that it is possible, even when a puzzle has a unique finished solution, to measurably distinguish two or more paths to a solution by tracking the order of execution of the steps of the puzzle solution.

This class of puzzles, of which Sudoku is a prime example, are within the more general, Constraint Satisfaction Problems (CSPs). We note, furthermore, that activities which can be modeled by a puzzle in the class of interest may be similarly amenable to performance distinctions based on the order of execution of steps.

In the class of logic puzzles or problems to which the methods of several embodiments of the present invention apply, the player or players are given a structure containing a number of cells, or spaces; a collection of characters that are often alphanumeric, and asked to fill the cells. Typically, one character is filled into a space or cell, according to a set of constraints and rules.

We begin by showing that it is indeed possible for the puzzles, games and activities in the target class: (i) to fashion tracking mechanism for the order of execution of steps of a solution, and (ii) to ascribe a measurable quantity with such tracking.

We demonstrate that the order of execution of the steps of solving a puzzle can be effectively tracked by associating with the steps, labels from a sequence of labels with known order. Once a sequence of labels is available, a numerical value to each label in the sequence may be assigned, such that the order among the numerical values corresponds to the order of labels in the sequence of labels, and a strict one-to-one correspondence is maintained between the sequence of labels and the numerical values.

If such labels are associated with the steps of a path to solution for the puzzle, numerical values get assigned to the steps of execution via the labels. It becomes possible, then, to compute a quantitative, aggregated measure to represent a path to solution by using the values assigned to the steps in the path. And, if labels are defined so as to capture the logical differences between the solution-paths, then by comparing the aggregated measures representing two distinct paths we can measurably distinguish the logical differences between two distinct paths to solving a logic puzzle. Furthermore, this method of distinguishing paths to solutions via labels can actually be employed to measurably distinguish the logical differences even when the paths are unrelated or refer to distinct puzzles.

The distinctions based on the logical differences between the solutions, or between solution paths, can actually be put to use in the real world.

Such representations can be used to engender interest in logic, provide hints to solve puzzles, or provide quantitative methods to measure and compare "segments" of puzzle solutions, etc. to educate and to entertain.

Method of Associating Labels with Executing Steps of Solution

It starts with labels: What is needed to use this method for tracking the order of execution of each step of a solution is a set useable as labels, with a predefined or "natural" order to meaningfully describe a progression or "sequence", such as, the order of execution of steps.

The letters of the Roman alphabet, A, B, C, . . . , or the set of integers 1, 2, 3, . . . , are readily available sets for which the terms "order", "preceding" or "succeeding" etc. have meaning, and they ought be useable as labels. Thus, it is possible to use the letters as labels for the steps of the activity such as number-based Sudoku, for example, and the set of integers as labels for "word" Sudoku where the puzzle cells are filled with letters of the alphabet.

Next, an algorithm for labeling the steps of execution to induce an order by the letters of the Roman alphabet may be set up as follows:

Given a sequence of labels, associate the first label with the filling of any cell of the puzzle that is filled based only on the given rules/constraints and any given non-empty (pre-filled) cells. Next, associate with the second label cells that are filled based on the given rules, the pre-filled cells and the cells filled and associated with the first label; and, so on inductively.

Thus, for example for Sudoku, associate the letter A with a cell if the number in the cell is determined directly, based only on the basic rules or constraints and the numbers given at the start of the puzzle; then, associate the letter B with a cell if its filling is based on the basic rules, information given at the start of the puzzle and possibly one or more cells associated with A but not based on any cell associated with A or a letter that succeeds A in the Roman alphabet; associate the letter label C with a cell if its filling is based on the given information and possibly on one or more cells associated with B, but not on any cell associated with the letter C or "higher"; and so on. This algorithm, to avoid "circular logic" can be stated as the rule for labeling as follows:

Rule: Associate a letter of the alphabet as label with the filling of a cell if the filling is based in part on one or more cells associated with the letters preceding the letter in the alphabet, but not based on any cell associated with a letter that does not precede the (chosen) letter.

This labeling rule is in addition to the customary basic rules for n-by-n Sudoku that may be stated as:

Rule 1: No cell may be filled with a number such that a number is repeated in a row; and
Rule 2: No cell may be filled with a number such that a number is repeated in a column.
Rule 3: If for a particular cell in an n-by-n grid all numbers from the set, 1–n, except one number can be eliminated by rules 1 or 2, then that cell may be filled with the one number not eliminated.
Rules 1, 2 and 3 hold for a number of logic puzzles, including Sudoku and KenKen.
Rule 3 states the following important practical perspective on the puzzles of interest: Although the filling of a space or cell is an affirmative act, it is truly an investigative exercise in determining the numbers that may not be used to fill the cell.

Association of Labels with Steps of Solving by Trial-and-Error

The above rule, however, does not provide adequate guidance when the character to fill a space is not easily determined. In many scenarios, a space/cell of the puzzle either requires filling by trial-and-error or the players resort to trial-and-error, wherein multiple candidate characters may be tried before deciding on the placement of the correct character in the space (trying all integer numbers 1-9 for Sudoku, for instance). A labeling scheme must appropriately treat this scenario.

Some embodiments of the present invention propose to handle generation of labels for this scenario by observing that the typical goal of the puzzle is to fill the spaces efficiently and that trial-and-error is typically inefficient. The effect of trial and error is often to prolong the process of determination of the character label, resulting, e.g., in a "higher" letter of the alphabet or a more "distant" label for the step of filling the cell than if a label is found more directly by eliminating candidates bound to fail.

There may be several meaningful ways to associate labels with a cell which has plural, non-obvious candidate characters for filling it. The process selected here, as an example, is via a labeling mechanism that considers trials with characters that fail, i.e., end in a contradiction with a rule, a given pre-filled space or a space (correctly) filled at a prior step in the solution process.

Thus, in the case where there are only two possible characters that can fill a cell, one of them will lead to a contradiction and other can correctly fill the space. If, for example, the contradiction would occur at step that might be labeled X (assuming Roman characters are used for labels) by filling the first of the two characters, then fill the space with the other (second) character and associate the label Y (the immediate successor to X in the sequence of labels) with the filling. This manner of associating labels is consistent and compatible with associating the first label with filling a cell based only on the given rules and given-filled cells.

This scheme means that filling the correct character into a space is associated with a label that depends on the other character, the one that cannot be placed into the space without eventual contradiction. This scheme expresses the attribute of puzzles (e.g., Sudoku), and more generally of constraint satisfaction problems, that the primary tool to satisfy constraints is to eliminate the unworkable options.

This scheme of using contradiction(s) to find the appropriate label(s) can be extended to the case where there are three or more possible character options to fill a cell. It can be extended by taking the possible characters pairwise for filling of the cell, resolving the character for the filling and the associated label, considering all options by turn, finally finding a label in the sequence of labels as described above for the filling of the cell with a character which avoids contradiction with any prior filling.

However, one can streamline the scheme of using contradiction(s) to find the appropriate label(s) if there are more than two possible options to fill a cell, as described in next few paragraphs.

Where there are three or more possible characters to consider for filling the space at a solution step, the cell has to be filled by trial-and-error, with the only number that does not lead to a contradiction.

Suppose all possible numbers for filling the cell are put on a List and that the sequence of labels is the Roman alphabet, {A, B, C, . . . }. Suppose, the List is made by deleting from consideration the numbers which easily observed to conflict with a rule, with another cell already filled, given or filled in the process up to the current step.

Since only one number can be correctly placed in a cell by assumption, eventually all the numbers in the List, except one, will lead to a contradiction, and therefore eliminated. The one remaining number will correctly fill the cell. We find the label for the filling based the other characters on the List which lead to contradiction.

Thus, to find the label: (i) place a candidate character on the List, tentatively, in the space to be filled; (ii) associate the placement with a tentative label, based on the point in the solution process at which the cell is being filled; (iii) continue from this space onward with the steps of filling empty spaces and associating labels by the Rule for labeling until there is a contradiction; (iv) jot down the label at which the contradiction occurs; (v) if there are multiple contradictions along different paths from the cell being filled then jot down the label that is closest to the tentative label; (vi) term the jotted down label as the "first" label associated with contradiction; (vii) repeat the process of tentative placement of characters for each character on the List; (viii) find the label that is furthest from the tentative label among all the "first" labels associated with contradictions (for multiple candidate characters); (ix) fill the space with the one character for which no contradiction is found; and (x) associate with the filling the label that succeeds the furthest label found by at least one place in the sequence of labels.

As an example, suppose we are at the stage of filling a cell where the last label in the path was B. Pick a number from the List and tentatively link it to the cell with associated label C and proceed to fill other cells. If a contradiction thereupon occurs at the stage of label E, for example, make a record of this fact, then attempt to place the next number in the List. Suppose the next number on the List also ends in a contradiction, at the stage of linking the character (number) associated with label F, again make a record of this fact. Proceed similarly with all numbers in the List. Suppose, L ends up being the "highest" label (i.e., with the highest ordinal in the sequence of labels) for the numbers in the List for which there is contradiction. Then associate M with filling this cell.

Note that the "furthest" label would generally be the most "distant" in the sequence of labels from the "tentative" label, by count, in the sequence of labels, and in the optimal case would lead to a label for filling the cell that "just" transcends the ones associated with any of the contradictions. In the above example we tacitly assume that E and F etc. are the "first" labels linked to contradictions. To the extent that they are not "first" labels, the association of a label with the filling of the cell will be sub-optimal, but not incorrect. In a competition, e.g., a player would strive to choose a path to fill the empty spaces so as to optimize labeling.

For organizing this algorithm (and for record keeping), when uppercase alphabet is used for labels, it is useful to introduce a different, secondary set that can be mapped to the set of labels to associate with the List (of possible characters). For the labels A, B, C etc., the uppercase Roman letters, such a readily available secondary set of characters is the lowercase Roman letters, a, b, c, etc., which may be used (for example, for Sudoku) as follows: if, in the List of possible numbers for a particular cell no other cell with the label higher than A will affect the filling, then associate the character "a" with the List; if no other cell with label higher than B affects the filling then associate the character "b" with the List; and so on; and, if the List is drawn based only on the pre-filled cells then do not associate any lower case character with the List.

Conceptually, in this scheme, the lowercase letters can be thought to capture the state of the puzzle's solution-in-progress at the end of associating as labels the corresponding uppercase letters A, B, C, etc. with the cells. The List of possible characters and secondary labels are merely interim tools for the determination of actual label associations with A, B, C, etc.

This process of using uppercase and lowercase letters to determine labels for trial-and-error filling of puzzle cells is explained here with the example of the Sudoku puzzle of drawing FIG. 4, shown partially filled in drawing FIG. 5. To keep the view uncluttered FIG. 5 shows only the label A, that is associated with the cell positions, (1,2), (1,4), (3,1), (5,6), (7,8), (8,5), (9,2) and (9,3), all of which are easily determined by the cells given filled and the rules for Sudoku. It also shows the "List" characters for some of the cells, where the cell may be filled by no more than three possible numbers. Where the List to fill a cell has four or more possible numbers, it is left blank in FIG. 5 for viewing clarity.

In practice, it is better to continually update the Lists for cell fillings as more cells are filled and further labels are assigned than to labor through trials and contradictions, one cell at a time and with initial Lists. Lowercase letter(s) associated with a List may change when the List is updated with more information during solution process.

The use of Lists is explained next by considering the (1,5) cell.

The List of possible numbers for filling the cell in fifth column of first row, (1,5) position, is 4, 7 and 8.

If we place number 4 in the cell (1,5), then 5 must be placed in the cell (2, 5) because no other number from 1 to 9 can avoid conflict with the numbers already in the $2^{nd}$ row or $5^{th}$ column. But if 5 is in (2,5), then no number from 1 to 9 can be filled into (8,5) position, and that would be a contradiction of Sudoku rules.

Therefore, 4 cannot be filled into (1,5). Also, were it possible to place 5 in (2,5), it would have led to a contradiction at (8,5) after (i.e., as a result of) a label A association, or at (the beginning of) B.

If we place the number 7 in the cell (1,5), then 7 cannot be placed in (1,8) or (1,9). But 7 cannot be placed in (2,9) because of conflict with the given 7 in (2,2); therefore, there would be no cell where 7 could be placed in the top right box, which is a contradiction of the rules of Sudoku. This contradiction would occur at the stage of associating label A.

Therefore, the cell (1,5) must be filled with number 8, the only remaining number in the List.

For label association with this filling, look at the List of all possible numbers, and the associated labels where contradictions occurred. In this case, those labels are B and A. The label furthest in this list in the sequence of labels is B.

Therefore, the cell (1,5) is filled with the number 8 and associated with the label C (successor to B in the sequence).

If a player were to choose to associate the label B with the filling, that would be akin to using "circular logic" (of label association B, based on B) and therefore incorrect according to the rule for label associations.

But if, on the other hand, if a player were to choose to associate the label D with this filling, for example to be safe in their calculations, it would acceptable—the label D for filling the cell (1,5) would not violate the labeling rule but could adversely affect the Measure of Efficiency of the player's solution-path since the label C is adequate.

It is important to note that different labels for the same cell filled with the same character are nevertheless considered parts of different solution-paths, as they can impact the associations of labels further down in the process of filling the spaces differently.

In practice, it can be daunting to find associations of all labels by trial-and-error. It is generally more practical to fill and associate the cells with appropriate labels directly by the constraints and/or observation as far as possible, and, then fill and associate labels for smaller number of remaining empty cells by trial-and-error. An expert player may, however, be able to see, and logically explain, adroit and quick ways to eliminate character(s) from a List.

FIG. 6 shows a solution of the puzzle of FIG. 4, where the blank cells have been filled numbers from 1 to 9. It also shows the Lists for some cells at different points in the solution process using the lowercase letters when labels associated with cell fillings are uppercase letters. FIG. 6 also shows logical reasons using the illustrative icons given below herein. These icons together with the order in which the cells get filled in the solution process can help communicate a player's logic for filling the cells as they did. This logic may be used by the computer system to verify the cell fillings and associated labels, and by the administrators of a competition, for instance, to accept or isolate the solution-path.

It can be verified in the case of this easy puzzle that the labels shown in FIG. 6 are not necessarily the "lowest" possible letters for all the cells. For example, the label for cell (7,4) is entered as 'D' but a more alert player would notice that a 'C' would also be possible. D is not incorrect because it does not violate the rule for label associations, but it is not optimal. In an ideal case, each cell would be filled so that the measure of efficiency is optimized.

Optimization of the measure of efficiency of a puzzle cannot be generally determined from the initial data without knowledge of at least some of the possible solutions. This is generally true of all methods of evaluating the "difficulty" levels and similar descriptors for puzzles or constraint satisfaction problems. Label association and measure of efficiency computation are additional tools to estimate difficulty of a puzzle.

Verification of Labels Associated with Steps of Solving

Label association for filling the cells of the puzzle is of consequence for real-world utility, regardless of how the labels are found, and it must be verified.

Verification of the association of labels is best carried out by a computer system; the process is too labor-intensive and error-prone if done manually. More importantly, for several real-world scenarios (selection of a winner in a competition, for instance), it is advisable that to assure the privacy, independence, security and integrity of the verification process, it is carried out by a computer with appropriate capability and safeguards.

To verify label association, it is required to ensure the Rule for label association is followed. For example, to ensure that a cell associated with label "C" (when uppercase letters of the Roman alphabet are used as labels) is not filled and labeled based on another cell associated with C or subsequent letter. If a path or solution segment provided by a player has an incorrectly associated label, then that path may be removed, isolated or set aside for further process by the administrative regimen of the organization calling the activity or a competition etc. before the path is used for intended utility.

Since label association with the steps of an activity is intimately connected to underlying logical reasons, the administrative regimen of the game or competition etc. may also require certain players or participants to communicate the logical reasoning behind their filling the puzzle cells with characters, for instance, as well as the logical reasons for label selections. A possible way to organize the puzzle solving activities, for example, in part may involve: (i) Player identifies the space to fill and the fills it with a character from the given set; (ii) computer records step number at which the space is filled; (iii) player identifies the label for the filling; (iv) player provides his/her logical reasons for selection of the character and the label; (v) computer records the player's reasons along with the other data for filling the space; (vi) computer echoes the record of data for filling the space, possibly on demand; (vii) the record, including, the cell location, step number, character, label and logical reason(s), is used by computer for purpose of verification, or by player(s) to revise character placement, label or reason, if allowed to do so.

The administration of the activity may allow a player, in certain situations with specific rules, to review and revise character placement or label etc. In a competition, e.g., it may allow revision within a very short span of time after a step is executed, or allow all players to revise their solutions at the end if there is time remaining. Or, such revision may be allowed for certain classes of players or in other scenarios similarly, based on specifics of the competition, activity, participants and the milieu etc. Of course, there may be high-stakes situations/competitions which do not permit any rectification in the solution steps after the data is entered.

Suitable iconography may be devised and used to stand in for, or succinctly communicate the logical reasons for user/computer actions. Such communication may be between a player and computer (or another input/output device), between players/computer, between players and other entities, or among several players; it may also involve (two-way) communication for live or online audiences for the activity. Given below in this description is an example of logical rules and icons compiled for Sudoku. These rules and icons are not meant to be exhaustive; additional rules and icons are expected to be added or refined for specific games and activities, including Sudoku.

The icons signifying the logical reasons for filling the cells of the puzzle of FIG. 4 are shown in FIG. 6 according to the set of icons appended herein:

The practice of this invention envisions providing specific formats and templates in order to concisely capture the data as each step of the activity is executed. For example, inter alia, data for uniquely identifying and filling of each empty space, including, the specific character filled, identification of the position in the sequential order at which the empty space is filled in the path, the label associated with the filling, and the logical reason or reasons for the filling and the corresponding label. Such formats and templates can be particularly useful for communication, for instance, if a puzzle solving competition is held before live or remote audience.

Presentation of the data and logical reasons for filling each cell in the popular, Sudoku competitions for instance, can be of great educational value for audience involvement in the solution process, and more generally, in the art of logical argumentation.

Selection of Solution-Paths for Intended Utility

The disclosure of the parent application envisioned compiling many solution-paths offered by multiple users/players/participants for each puzzle or activity, which after removing any solutions that contain an error, would then be combined by the computer system into synthesized labels associated with the spaces filled in the process of filling empty spaces of the puzzle. The reasoning behind such combining is that a synthesis of multiple previous solutions does not discard any reasonable solutions offered in order to generate hints for subsequent users/players/solvers of the puzzle, which is more useful for human users/players/solvers than the hints based on a single solution.

Combining the labels, however, is not appropriate for some other envisioned practice scenarios. For example, where solution-paths are compared, especially to rank or reward individual attempts of an activity, combination of solution-paths is not meaningful.

In other situations, it may be advisable to generate the hints based on a single-solution, for instance where members of a team or group take turns, one-by-one, to take hints from a previous solution and generate a new one to pass along to the next member.

Even when labels are determined based on a single solution or solution-path, it is necessary to do so based on correct labeling and to have a plan or procedure to deal with solutions-paths which contain logical errors. The embodiment suggested herein, as an example, is to separate the paths that contain no logical errors from those that do; the paths that contain no logical errors are put into a First Subset and recorded in a First database by the system, while those that contain at least one logical error are put into a Second Subset and recorded in a Second database. This separation allows administrative flexibility in the case of solutions containing very few or minor/easily correctable errors.

Puzzle Solution, Puzzle Complexity and Association of Labels with Steps of Solving There is an intricate relationship among the order of execution of the steps of solving a puzzle, the association of labels for the steps and the complexity of the puzzle: The order in which empty spaces of the puzzle are filled controls the association of labels. But since at each step there could be multiple directions to take for a solution-path, it is not generally possible to go backwards and determine from the chain of labels associated with the steps the order in which the steps of solving were actually executed.

While a more complex puzzle will generally have a longer sequence of associated labels than a "simpler" puzzle, in practice the length of the sequence of labels associated depends in part on the skill and alertness of the player among other factors unrelated to complexity; thus, e.g., an adept player can solve the puzzle using an optimal or shorter sequence of steps and labels than a less skilled player.

It is precisely this complex relationship between skill and labels that makes it possible to compare solutions (or paths to solution) for the puzzle proffered by different players. A winning solution may have a higher frequency of the beginning letters of the alphabet as labels, for instance, and a lower frequency of latter letters than a solution ranked lower.

Rules for Association of Labels

Recall the precise formulation of the basic rule stated above for label association for a manner of tracking the steps of execution of an activity: "Rule: Associate a letter of the alphabet as label with the filling of a cell if the filling is based at least in part on one or more cells associated with the letters preceding the letter (chosen as label) in the alphabet, but not based on any cell associated with a letter that does not precede the (chosen) letter."

While this rule is stated for a puzzle where empty cells (of a puzzle board, e.g.) are filled with characters from a given set, it can be generalized similarly for other activities that can be modeled by such puzzles.

This statement of the labeling rule avoids circular logic while tracking the steps, but it is not prescriptive otherwise; therefore, the labels for the spaces are not necessarily, or generally, unique. An empty space filled in the puzzle may be associated with two or more distinct labels, depending on the step in the solution-path at which it is filled. Along with complexity of a puzzle, the present invention employs to advantage, this multiplicity of possible labels (often at several steps) to distinguish the solution-paths logically.

Logical Rules and Icons for Association of Labels for Puzzles

The rules for filling spaces/cells for a puzzle, such as Sudoku or KenKen, are compiled below with distinct icons, useful for communication of logical reasons for the steps of filling the empty cells:

❶ —Based on given-filled cells, the only Character that can be filled into the space;

❷ —Based on given-filled cells, the only Cell in Row, in which the specific Character can be filled;

❸ —Based on given-filled cells, the only Cell in Column, in which the specific Character can be filled;

❹ —Based on given-filled cells, the only Cell in Box, in which the specific Character can be filled;

❺ —Based on cells previously filled (by player), the only Character that can be filled into the space;

❻ —Based on cells previously filled, the only Cell in Row, in which the specific Character can be filled;

❼ —Based on cells previously filled, the only Cell in Column, in which the specific Character can be filled;

❽ —Based on cells previously filled, the only Cell in Box, in which the specific Character can be filled;

❾ —The Character or Characters possible for filling the space are based on a List for trial, with an identical Pair of characters in a Pair of cells other than the space to be filled, in the Row, Column or Box containing the space;

⓪ —The Character or Characters possible for filling the space are based on a List for trial, with an identical Triad of characters in Three cells other than the space to be filled, in the Row, Column or Box containing the space.

The reason ❾ is applicable when the same pair of numbers are the only possible numbers in exactly two cells in same row, column or box (as the cell to be filled), leading to the conclusion that neither of the two numbers can be filled into a third cell in the row, column or box without a contradiction.

The reason ⓪ applies similarly when a triad of numbers is on the List of possible numbers for three cells in the same row, column or box as the cell to be filled.

Reason ❾ helps eliminate the pair of numbers for the cell to be filled even before attempting to actually fill either of the pair of cells. Reason ⓪ helps eliminate three numbers from consideration for cells other than the three cells containing the triad.

Both the logical rules, ❾ and ⓪, reinforce the property of Sudoku and like puzzles that solving them is an exercise in "untangling" the cycles of numbers (or characters) which are filled into the cells through eliminations.

This collection of rules is an example, not meant to be exhaustive. For 81-cell Sudoku these logic rules may suffice for the labeling; there may be a need for other or additional rules for other puzzles. Additional rules may be needed as well for further refinement of the process. It may be necessary, in addition to these rules, to communicate the prior-filled cells used for character (number) and/or label specification.

Depiction of Different Solutions to a Puzzle by Suitable Means

While not expressly illustrated herein, it is easily grasped that by using different colors, for example, for different labels the differences may be visually presented for instant communication of the difference in complexity of the two puzzles. Similar considerations apply for using auditory distinctions. The use of labels permits distinctions to be presented also by suitable other means for communication and/or comprehension either within or between the solution-paths for a puzzle or puzzles.

It will be recognized also that there exist many alternatives for defining the sequence for tracking the order of steps and that the order of completion is germane to scoring and calculation of efficiency metrics. And, many of the several mathematical alternatives may be used for scoring formulas. Many alternatives exist also for mathematical calculation of values of the descriptors for solutions or a solution-paths, and they may be used similar to the manner outlined herein.

By using different colors, or by other distinct representations for the different labels, the differences may be visually presented for instant communication, for instance, of the difference in complexity of the two puzzles. The measure of efficiency may be used to compare not only the solutions for the same puzzle, but also to compare, to an approximate extent, the solutions and inherent difficulty levels of two different puzzles.

Hints for Solving a Puzzle

It is important to note that the structure of a puzzle is only partially captured by the number of empty cells. For attributes, such as complexity, the structure of a Sudoku puzzle depends to a great extent on the distribution of the numbers provided in the cells at the start and a graphic depiction of the puzzle based on labels can provide much more information about the structure of the puzzle.

Non-visual hints may also be provided based on the methods disclosed herein. As stated above, the hints may be auditory sounds, animation, or video. The hints may also comprise other types of input, for example, olfactory input, or combination of different types of input.

The hints must be able to be organized in a sequence and able to be associated with the discreet steps of the activity. Such organization would allow for hints that still do not reveal too much of the solution to detract from the pleasure of working out the puzzle but help a player who is stuck at a particular point in the activity.

Additionally, similar to the color coding of visual hints, the auditory sound or other types of hints can be determined a priori and communicated to a player either dynamically when he/she clicks on a particular cell at any point in the process of solving the puzzle, or at the start.

In particular, for dynamic hints, a player may be given some control over the manner in which hints are displayed, as well as on considerations, such as: the lapse of time before a hint is provided, the location of the hint on the puzzle board (to maintain a level of desired cognitive load), and/or the history of hints used by the player, and so on. When the hints are provided to members of a team in a competition, for example, such customization may be quite desirable to keep all members engaged.

As discussed above for the case of typical Sudoku, the method may proceed, for example, as follows: (1) maintaining record of the order in which the cells are filled by digits 1-9, by linking the stage at which each cell is filled with the letters A, B, C etc. to represent the order of filling the empty cells and/or the "stages" of cell fillings; (2) assigning numerical values to each of the letters A, B, C etc. (3) finding a weighted average for the solution, as executed in the exact order of filling the cells, to obtain a measure of the specific path taken to solution by using the numbers of cells tagged with each of the labels A, B, C etc. and their assigned numerical values;

(4) comparing two or more solutions (paths) by their respective measures, and (5) ranking the solutions in order according to their respective measures.

The claimed method can also be utilized to provide creative insights into the structure of an individual puzzle itself. When the spaces are filled at different stages in the process, the claimed methods can discriminate between spaces by the layers (e.g., defined by labels), grouped by the points at which those spaces may be filled in. Alternatively, it may be possible to group certain spaces by a sequence or "path," connected, not by locations on puzzle board but by the logical connections which allow the player to fill in the spaces, in related chain or tree structure.

Creative Expression of the Solutions to Puzzles

Such a structure created through the claimed method has many potential uses. A visual depiction of the structure could allow for simple side-by-side comparison of two separate puzzles, or be combined to create an overlay. More creatively, a person could use the visual representation of the structure as the basis for a painting or other work of art.

A unique expression may be created by using the labels for a puzzle. The labels add another dimension besides numbers filling the cells of a puzzle grid like Sudoku. That extra dimension may be used to create interesting 3-D models of the solutions. Thus, for example, colors may distinguish the labels and the heights of columns may distinguish the numbers placed in the grid for a 3-D model of a solution. Or, the colors may distinguish the numbers in the grid and the column heights may correlate with the labels (with the higher columns representing the "higher" labels).

Practitioners in the field would appreciate that other variations of this manner of creating models are realizable. For example, a visual representation of a suitable puzzle could also be used as the basis of fine art creation or rendition of a performance.

Another creative application for the structure of a puzzle is as a basis for music. Music, though created through artistic expression, has a great deal of similarity with puzzle structure; for example, the key a piece is written in, its time signature, or the various chords in a song. Thus, the structure of a puzzle could be used as yet another basis for musical structure, which could produce or compose musical pieces unique to each individual puzzle. The piece for a typical Sudoku puzzle would depend on creative interpretation of the dimensions corresponding to the numbers, labels and relative positioning of the cells filled with both, for example.

Many or all of these possible uses of the described techniques may be combined into a television program which features all the aspects described above. Competitors could be challenged to complete puzzles, and their solutions would be judged for efficiency. During, between or at the end of these competition rounds, composers and dancers could be challenged to create unique songs and dances based on the individual puzzle. Judges could rate the participants on criteria, such as, the relative efficiency of the solutions, in addition to or on how closely they followed the structure of the puzzle, as well as on its aesthetic values.

Further Notes on Implementation of the Method

The above-described embodiments of the present invention can be implemented in any of numerous ways. For example, some aspects of the embodiments may be implemented using hardware, software or a combination thereof.

When implemented in software, the software code can be executed on a suitable processor or collection of processors, whether provided in a single computer or distributed among multiple computers. It should be appreciated that any component or collection of components that perform the functions described above can be considered as one or more controllers that control the above-discussed functions. The one or more controllers can be implemented in numerous ways, such as with dedicated hardware, or with general-purpose hardware (e.g., one or more processors) that is programmed using microcode or software to perform the functions recited above.

In this respect, it should be appreciated that one implementation of the embodiments of the present invention comprises at least one non-transitory computer-readable storage medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different from illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely to describe and distinguish one claim element having a certain name from another element having the same name or descriptor (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Finally, while much of the description has used the language appropriate to puzzles like Sudoku where cells or spaces are actually meant to be filled, much of the methodology, techniques and procedures may be extrapolated to other games and activities, if they can be modeled by logic puzzles.

Also described here is the functionality and requirements of the computerized machines and networks which enable the carrying out of various processes. These machines may form subsystems within larger engines or platforms to enable the multiple utilities outlined above. Aside from holding copious volumes of data, these machines carry out verification of solution steps and label associations and generating merged labels and hints, for example.

Having described several embodiments of the invention in detail, it is anticipated that various modifications and improvements will readily occur to those skilled in the art. Such modifications and improvements are intended to be within the spirit and scope of the invention. Accordingly, the foregoing description is by way of example, and is not intended as limiting.

What is claimed:

1. A method of comparing and quantitatively distinguishing parts of one or more solution-paths for solving a puzzle on the basis of values of said parts based on an order of execution of steps of the one or more solution-paths, wherein,
the order of execution of the steps is tracked by associating with them labels from a sequence with known order,
the values are computed by a computerized system that includes at least one computing device or a network of computing devices to which information and data for computation can be provided,
the puzzle has a given configuration of a set of spaces, a given set of distinct characters, and a given set of rules,
the set of spaces includes one or more empty spaces, a space being non-empty if it has a character filled in it,
a step of a solution-path represents filling an empty space of the one or more empty spaces with a character selected from the given set of distinct characters, consistent with the given set of rules and the given non-empty spaces if the set of spaces includes one or more given non-empty spaces,
the puzzle is solved by one or more steps of filling the one or more empty spaces in the set of spaces,
a solution to the puzzle is complete when all empty spaces in the set of spaces are filled,
a solution-path is a chain of two or more steps which are linked in same sequential order in which the corresponding two or more empty spaces of the one or more empty spaces are filled,
solutions to the puzzle with empty spaces filled in a different order are solutions of the puzzle by distinct or alternative solution-paths,
compared parts of solution-paths are different parts of the same solution-path or parts of more than one distinct or alternative solution-paths,
a first step of a solution-path has no prior step, and at the first step of the solution-path, an empty space of the one or more empty spaces is filled with a character from the given set of distinct characters based on the given set of rules and the given non-empty spaces in the set of spaces,
a second or subsequent step of the solution-path comprises filling an empty space of the one or more empty spaces with a character from the given set of distinct characters based on the given set of rules, the given non-empty spaces in the set of spaces and a character filled in an empty space of the one or more empty spaces during one or more prior steps of the solution-path, and, the method of distinguishing parts of one or more solution-paths for solving a puzzle comprises the following actions:

(a) providing a sequence of labels, {Label(1), Label(2), . . . , Label(I), . . . } with a known sequential order;

(b) receiving a labeling algorithm for associating the labels with the filling of empty spaces in a solution-path, where Label(1) is associated with the first step of the solution-path, and each empty space filled at a second or subsequent step of the solution-path is associated with a label based on the known sequential order of labels in the sequence of labels;

(c) receiving by the computerized system, a first step of a first solution-path;

(d) receiving by the computerized system, an association of Label(1) with the empty space filled at the first step of the first solution-path;

(e) recording the association of Label(1) with the empty space filled at said first step of the first solution-path;

(f) receiving by the computerized system a next step in the first solution-path when said next step exists;

(g) receiving an association by said labeling algorithm of a label with the empty space filled at said next step;

(h) recording by the computerized system, the label associated with the empty space filled at said next step;

(i) receiving by the computerized system a first step of a next solution-path when said next solution-path exists;

(j) receiving by the computerized system an association of Label(1) with the empty space filled at said first step of said next solution-path;

(k) receiving by the computerized system, a next step in said next solution-path when said next step exists;

(l) receiving an association by the labeling algorithm of a label with the empty space filled at said next step in said next solution-path;

(m) recording by the computerized system the label associated with the empty space filled at said next step in said next solution-path;

(n) starting a computerized process on the computing system to verify if label associations for the cells filled in the one or more solution-paths are correct according to logical reasons of the labeling algorithm by checking each label for logical inconsistencies;

(o) receiving a determination by the computerized system if any of the labels associated with filling a given empty space for any of said one or more solution-paths is inconsistent with (i) a rule in the given set of rules, (ii) a given non-empty space in the set of spaces, or (iii) an empty space filled at any prior step of the solution-path;

(p) identifying by the computerized system from said one or more solution-paths, a first subset of the set of solution-paths for which no label is inconsistent;

(q) identifying by the computerized system from said one or more solution-paths, a second subset, of the set of solution-paths for which at least one label is inconsistent; (r) recording in a first database, first information and data associated with each solution-path in the first subset, where the first information and data includes the labels associated with the filling of the corresponding empty spaces;

(s) recording in a second database, second information and data associated with each solution-path in said second subset, where the second information and data includes the labels associated with the filling of its corresponding empty spaces, and to save or isolate the solution-path for further process or for removal of the solution-path from further consideration;

(t) providing a sequence of ordered numerical values;

(u) assigning a numerical value from the sequence of ordered numerical values to each label in a sequence of labels for each of the one or more solution-paths while maintaining correspondence of order between the sequence of ordered numerical values and the sequence of labels;

(v) receiving, for each of said one or more solution-paths in said first database, the numerical value assigned to each label associated with the filling of each empty space;

(w) receiving a formula for computing an aggregated value of the numerical values assigned to labels associated with filling the empty spaces in one or more parts of a given set of spaces for the one or more solution-paths in the first database;

(x) computing the aggregated value by said formula for the labels associated with filling the empty spaces in said one or more parts of one or more solution-paths in the first database being compared;

(y) saving said computed aggregated value for the labels associated with filling empty spaces in one or more parts of one or more solution-paths in the first database;

(z) comparing said computed aggregated values for labels associated with filling empty spaces in any two or more sets of labels in one or more parts of the one or more solution-paths in the first database; and (aa) performing an action based, at least in part, on the comparison of the computed aggregated values for two or more sets of labels associated with said parts.

2. The method of claim 1, comprising the following additional steps:

(ab) reviewing, for a solution-path in said second database, the labels associated with the steps of solving the puzzle, sequentially starting with a first label determined to be inconsistent;

(ac) replacing said first label to remove the inconsistency;

(ad) replacing labels for subsequent steps of the solution-path after the step associated with the first label as a result of said replacing the first label;

(ae) determining by the computerized system if the labels associated with filling of given empty spaces for the solution-path as a result of the replacing are inconsistent with a rule in the given set of rules, a given non-empty space in the set of spaces or an empty space filled at any prior step of the solution-path;

(af) repeating steps (ab), (ac), (ad) and (ae) if, after the replacing, a label associated with the filling of subsequent spaces in the solution-path is determined to be inconsistent with a rule in the given set of rules, a given non-empty space in the set of spaces or an empty space filled at any prior step of the solution-path; and (ag) recording the solution-path in said first database.

3. The method of claim 1, wherein said recording first information and data comprises the following acts:

(r1) prompting by the computerized system said provider of the solution-path to communicate logical reason or reasons, based on the rules, constraints and data, either given or logically derived from the given sets of information, for the filling of the empty space with a specific character and associating the label with said filling of the empty space;

(r2) receiving by the computerized system said logical reason or reasons; and (r3) recording by the computerized system the first information and data including the specific character filled, identification of the position in the sequential order at which the empty space is filled in the solution-path, the label associated with the filling, and said logical reason or reasons.

4. The method of claim 1, wherein
said given set of distinct characters is {Char(1), Char(2), . . . , Char(I), . . . Char($\lambda$)},
collectively identified as {CHARS},
said set of spaces is {Space(1), Space(2), . . . , Space(I), . . . Space($\sigma$)}, collectively identified as {SPACES};
the set of rules, including the given set of rules and the logical constraints for associating labels with the filling of empty spaces of the puzzle, is {Rule(1), Rule(2), . . . , Rule(I), . . . Rule($\rho$)}, collectively identified as {RULES}, and,
filling of Space(K) with a character Char(J) for integers J and K, for $1 \leq J \leq \lambda$, and $1 \leq K \leq \sigma$ is associated with the sequence of labels so that:
  Label(1) is associated with filling Space(K) with a character, Char(J), if the filling is not inconsistent with a rule in{Rules} or with any given non-empty space in {SPACES};
  Label(I) is associated with the filling of Space(K) with character Char(J), if the filling is not inconsistent with: a Rule in the set {RULES}, or a given non-empty space in {SPACES} or an empty space filled prior to Space(K) in the solution-path, or, with the association of the labels with those prior-filled empty spaces; and,
  the determining of the label, Label(I) to associate with the filing of Space(K) comprises the following acts:
    (o1) receiving a List of two or more characters from said set of characters {CHARS} with which the empty space Space(K) may be filled;
    (o2) seeking the character in the List to fill into Space (K) that is not inconsistent with: a rule in {Rules}, a given non-empty space in {SPACES} or with another space filled at a prior step of the solution-path;
    (o3) temporarily saving a label, TempLabel, to associate with the filling of Space(K);
    (o4) tentatively filling Space(K) with each character in said List, one by one, as a trial to solve the puzzle;
    (o5) counting, for each failed trial for filling Space(K), the number of steps in the trial filling to a logical error due to an inconsistency;
    (o6) saving for each failed trial with a character in said List, the number of steps to the logical error;
    (o7) finding the maximum among all the saved numbers of steps found for said failed trials for the List;
    (o8) identifying and saving as Label(I) a label in the sequence of labels that follows TempLabel by more than said maximum number;
    (o9) filling into Space(K) the only character from said List that does not lead to a logical error;
    (o10) associating the filling of Space(K) with the label identified in step (o8) as Label(I).

5. The method of claim 4, wherein for each failed trial with a character in said List, the minimum number of steps to the logical error is saved.

6. The method of claim 1, comprising a further step of:
(ab) saving for further processing, including selecting for rewards, a ranking of two or more parts of the one or more of the solution-paths in the first database, wherein the ranking is based on the comparison of the aggregated values of the labels corresponding to said two or more parts of the one or more solution-paths.

7. The method of claim 1, comprising a further step of:
(ab) saving for further processing, including selecting for rewards, a ranking of two or more segments of the given set of spaces, wherein the ranking is based on the comparison of the aggregated values of the labels associated with the filling of empty spaces in said two or more segments by the parts of the one or more solution-paths.

8. The method of claim 6 or 7, comprising a further step of:
(ac) selecting for rewards, participants within a predefined group of users, including users who subscribe to or place wagers according to a set of predefined rules, terms and/or conditions, including calls to place wagers to win based on parts of solution-paths or on segments of the set of given spaces.

9. The method of claim 8, wherein said predefined group of users are teams of two or more cooperating human players.

10. The method of claim 6 or 7, comprising a further step of:
(ac) furnishing specific information, including the association of labels with filling of spaces, to human users in response to specific predefined prompts.

11. A method of providing hints by a computerized system to solve a puzzle based on the order of execution of steps of solving, wherein,
the computerized system includes at least one computing device or a network of computing devices,
the puzzle has a given configuration of a set of spaces, a given set of distinct characters, and a given set of rules,
the set of spaces includes one or more empty spaces, a space being non-empty if it has a character filled in it,
a step of solving the puzzle comprises filling an empty space of the one or more empty spaces with a character selected from the given set of distinct characters, consistent with the given set of rules and the given one or more non-empty spaces in the set of spaces if the set of spaces includes one or more given non-empty spaces,
the puzzle is solved by one or more steps of filling the one or more empty spaces in the set of spaces,
a solution to the puzzle is complete when all of the one or more empty spaces in the set of spaces are filled by steps of solving the puzzle,
a solution-path is a chain of two or more steps of solving the puzzle which are linked in same sequential order in which the corresponding two or more empty spaces of the one or more empty spaces are filled,
solutions to the puzzle with empty spaces filled in different orders are solutions of the puzzle by distinct and alternative solution-paths,
a first step of a solution-path has no prior step, and at the first step of the solution-path, an empty space of the one or more empty spaces is filled with a character from the given set of distinct characters based on the given set of rules and the given non-empty spaces in the set of spaces,
a second or subsequent step of the solution-path comprises filling an empty space of the one or more empty spaces with a character from the given set of distinct characters based on the given rules, the given non-empty spaces in the set of spaces and a character filled in an empty space of the one or more empty spaces during one or more prior steps of the solution path, and the method of providing hints from the computerized system to a player comprises the following actions:

(a) providing a sequence of labels, {Label(1), Label(2), Label(I), . . . } with a known sequential order;

(b) receiving a labeling algorithm for associating the labels with the filling of empty spaces in a solution-path, where Label(1) is associated with the first step of the solution-path, and each empty space filled at a second or subsequent step of the solution path is associated with a label based on the known sequential order of labels in the sequence of labels;

(c) receiving by the computerized system, a first step of a first solution-path;

(d) receiving by the computerized system, an association of Label(1) with the empty space filled at the first step of the first solution-path;

(e) recording the association of Label(1) with the empty space filled at said first step of the first solution-path;

(f) receiving by the computerized system a next step in the first solution-path when said next step exists;

(g) receiving an association by said labeling algorithm of a label with the empty space filled at said next step;

(h) recording by the computerized system, the label associated with the empty space filled at said next step;

(i) receiving by the computerized system a first step of a next solution-path when said next solution-path exists;

(j) receiving by the computerized system an association of Label(1) with the empty space filled at said first step of said next solution-path;

(k) receiving by the computerized system, a next step in said next solution-path when said next step exists;

(l) receiving an association by the labeling algorithm of a label with the empty space filled at said next step in said next solution-path;

(m) recording by the computerized system the label associated with the empty space filled at said next step in said next solution-path;

(n) starting a computerized process on the computerized system to verify if label associations for the cells filled in the one or more solution-paths are correct according to logical reasons of the labeling algorithm by checking each label for logical inconsistencies;

(o) receiving a determination by the computerized system if any of the labels associated with filling a given empty space for any of said one or more solution-paths is inconsistent with: (i) a rule in the given set of rules, (ii) a given non-empty space in the set of spaces, or (iii) an empty space filled at any prior step of the solution-path;

(p) identifying by the computerized system from said one or more solution-paths, a first subset of the set of solution-paths for which no label associated with the filling of an empty space is inconsistent;

(q) identifying by the computerized system from said one or more solution-paths, a second subset, of the set of solution-paths for which at least one label associated with the filling of an empty space is inconsistent;

(r) recording in a first database, first information and data associated with each solution-path in the first subset, where the first information and data includes the labels associated with the filling of the corresponding empty spaces;

(s) recording in a second database, second information and data associated with each solution-path in said second subset, where the second information and data includes the labels associated with the filling of its corresponding empty spaces, to save or isolate the solution-path for further process or for removal of the solution-path from further consideration;

(t) providing a sequence of ordered numerical values;

(u) assigning a numerical value from said sequence of ordered numerical values to each label in a sequence of labels for each of the one or more solution paths while maintaining correspondence of order between the sequence of ordered numerical values and the sequence of labels;

(v) receiving, for each of said one or more solution-paths in the first database, the numerical value assigned to each label associated with the filling of each empty space;

(w) receiving from the player, a current location of a current space or an empty space to fill;

(x) receiving from the player, a parameter or parameters to define from the current location bounds of spaces in the given set of spaces within which to locate a next hint;

(y) saving by the computerized system the parameter or parameters; and (z) providing to the player, based on available previous solutions, as the next hint, a location of a space to fill: (i) within the bounds defined by the parameter or parameters, (ii) which would provide a solution-path to a space within the bounds, or (iii) that is an alternative empty space to fill outside of the bounds if no empty space within said bounds is identified by the computerized system.

12. The method of claim 11, comprising the following additional steps:

(aa) reviewing, for a solution-path in said second database, the labels associated with the steps of solving the puzzle, sequentially starting with a first label determined to be inconsistent;

(ab) replacing said first label to remove the inconsistency;

(ac) replacing labels for subsequent steps of the solution-path after the step associated with the first label as a result of said replacing the first label;

(ad) determining by the computerized system if the labels associated with filling of given empty spaces for the solution-path as a result of the replacing are inconsistent with a rule in the given set of rules, a given non-empty space in the set of spaces or an empty space filled at any prior step of the solution-path;

(ae) repeating steps (aa), (ab), (ac) and (ad) if, after the replacing, a label associated with the filling of subsequent spaces in the solution-path is determined to be inconsistent with a rule in the given set of rules, a given non-empty space in the set of spaces or an empty space filled at any prior step of the solution-path; and (af) recording the solution-path in said first database.

13. The method of claim 11, wherein said given set of distinct characters is {Char(1), Char(2), . . . , Char(I), . . . Char(,)}, collectively identified as {CHARS}, said set of spaces is {Space(1), Space(2), . . . , Space(I), . . . Space($\sigma$)}, collectively identified as {SPACES};

the set of rules, including the given set of rules and the logical constraints for associating labels with the filling of empty spaces of the puzzle, is {Rule(1), Rule(2), . . . , Rule(I), . . . Rule($\rho$)}, collectively identified as {RULES}, and, filling of Space(K) with a character Char(J) for integers J and K, for $1 \leq J \leq \lambda$, and $1 \leq K \leq \sigma$ is associated with the sequence of labels so that:

Label(1) is associated with filling Space(K) with a character, Char(J), if the filling is not inconsistent with a rule in{Rules} or with any given non-empty space in {SPACES};

Label(I) is associated with the filling of Space(K) with character Char(J), if the filling is not inconsistent with: a Rule in the set {RULES}, or a given non-empty space in {SPACES} or an empty space filled prior to Space(K) in the solution-path, or, with the association of the labels with those prior-filled empty spaces; and, the determining of the label, Label(I) to associate with the filing of Space(K) comprises the following acts:

(o1) receiving a List of two or more characters from said set of characters {CHARS} with which the empty space Space(K) may be filled;

(o2) seeking the character in the List to fill into Space (K) that is not inconsistent with: a rule in {Rules}, a given non-empty space in {SPACES} or with another space filled at a prior step of the solution-path;

(o3) temporarily saving a label, TempLabel, to associate with the filling of Space(K);

(o4) tentatively filling Space(K) with each character in said List, one by one, as a trial to solve the puzzle;

(o5) counting, for each failed trial for filling Space(K), the number of steps in the trial filling to a logical error due to an inconsistency;

(o6) saving for each failed trial with a character in said List, the number of steps to the logical error;

(o7) finding the maximum among all the saved numbers of steps found for said failed trials for the List;

(o8) identifying and saving as Label(I) a label in the sequence of labels that follows TempLabel by more than said maximum number;

(o9) filling into Space(K) the only character from said List that does not lead to a logical error;

(o10) associating the filling of Space(K) with the label identified in step (o8) as Label(I).

14. The method of claim 13, wherein for each failed trial with a character in said List, the minimum number of steps to the logical error is saved.

15. The method of claim 11, comprising a further step of:
(aa) saving for further processing, including selecting for rewards, a ranking of two or more parts of the one or more of the solution-paths in the first database, wherein the ranking is based on the comparison of the aggregated values of the labels corresponding to said two or more parts of the one or more solution-paths.

16. The method of claim 15, comprising a further step of:
(ab) selecting for rewards, participants within a predefined group of users, including users who subscribe to or place wagers according to a set of predefined rules, terms and/or conditions, including calls to place wagers to win based on parts of solution-paths or on segments of the set of given spaces.

17. The method of claim 16, wherein said predefined group of users are teams of two or more cooperating human players.

18. The method of claim 15, comprising a further step of:
(ab) furnishing specific information, including the association of labels with filling of spaces, to human users in response to specific predefined prompts.

19. The method of claim 11, comprising a further step of:
(aa) saving for further processing, including selecting for rewards, a ranking of two or more segments of the given set of spaces, wherein the ranking is based on the comparison of the aggregated values of the labels associated with the filling of empty spaces in said two or more segments by the parts of the one or more solution-paths.

20. A system for solving a puzzle, the system comprising:
a game board in a tangible medium with tangible pieces including a set of pieces displaying labels in a set of labels used to track an order in which empty spaces of the puzzle are filled, wherein (i) the game board has a set of spaces to display displaying cells of a given puzzle with a particular structure and configuration, including:

a. a given set of spaces corresponding to the cells of the puzzle;

b. a given set of distinct characters with which empty spaces in the given set of spaces of the puzzle may be filled, or associated, to solve the puzzle, where a space is non-empty if it is filled with a character from the set of distinct characters, and the puzzle is correctly solved when each space of the given set of spaces is filled or associated with one and only one character from the given set of distinct characters; and c. a given set of rules, by which an empty space on the game board may be filled or associated with a character from the given set of distinct characters to correctly solve the puzzle, wherein said given set of rules is displayed on a display implemented as a tangible display or one or more virtual displays on a computerized device;

(ii) the tangible pieces include pieces displaying the characters in said given set of distinct characters with which the spaces of the given set of spaces may be filled or associated;

(iii) said set of labels which has a known sequential order is used to track an order in which empty spaces of the puzzle are filled in an attempt to solve the puzzle by the given set of rules provided for label association;

(iv) a secondary set of labels are distinguishable from, but with mapping corresponding to, the set of labels, for use in determining label associations for filling the spaces in the given set of spaces, which are displayed on the tangible pieces or which are displayed virtually on a computerized device;

(v) the set of rules for associating the set of labels or the secondary set of labels with the filling of an empty space of the puzzle are displayed on the tangible pieces or are displayed virtually on a computerized device; and (vi) a display implemented as tangible media or virtually on a computerized device tracks the order in which empty spaces of the puzzle are filled in an attempt by the player to solve the puzzle, where for a given empty space the tracking comprises maintaining data including the following: the character filled, a step number at which the empty space is filled in sequential order of filling the spaces, a label associated with the filling of the space, and one or more of the secondary labels if utilized to determine the label.

21. The system of claim 20, further comprising:
a computerized device configured to connect to a computer network, and to download data from and upload data to said computer network.

22. The system of claim 20, wherein said set of rules or algorithms for associating the primary set of labels, such as, {Label(1), Label(2), Label(I), . . . } with known sequential order, are associated with the filling of empty spaces in a path to solution, where,
  a path to solution, or solution-path, is a chain of two or more steps of solving the puzzle linked in same sequential order in which the corresponding two or more empty spaces are filled, and label association comprises:
  associating Label(1) with a first step of the solution-path, and at a subsequent step of said path, associating a label based on the sequential order of labels used at prior steps of filling empty spaces.

23. The system of claim 20, wherein the primary set of labels {Label(1), Label(2), Label(I), . . . } is comprised of the set of the uppercase letters of the Roman alphabet, A, B, C, . . . , and said secondary set of labels comprises the lower case letters a, b, c, . . . , of the Roman alphabet with the known correspondence between uppercase and lowercase letters.

24. A method of expressing the structure of a puzzle in an artistic work by associating labels with the order of execution of the steps of solving the puzzle for one or more parts of one or more solution-paths for the puzzle, wherein,
  the puzzle is provided in a tangible medium or on computerized system which includes at least one computing device or a network of computing devices,
  the puzzle has a given configuration of a set of spaces, a given set of distinct characters, and a given set of rules,
  the set of spaces includes one or more empty spaces, a space being non-empty if it has a character filled in it;
  a step of solving the puzzle comprises filling an empty space of the one or more empty spaces with a character selected from the given set of distinct characters, consistent with the given set of rules and the given one or more non-empty spaces in the set of spaces if the set of spaces includes one or more non-empty spaces;
  the puzzle is solved by one or more steps of filling the one or more empty spaces in the set of spaces;
  a solution to the puzzle is complete when all of the one or more empty spaces in the set of spaces are filled by steps of solving the puzzle;
  a path to the solution, or solution-path, is a chain of two or more steps of solving the puzzle which are linked in same sequential order in which the corresponding two or more empty spaces of the one or more empty spaces are filled;
  solutions to the puzzle with empty spaces filled in different orders are solutions by distinct and alternative solution-paths;
  a first step of a solution-path has no prior step, and at the first step of the solution-path, an empty space of the one or more empty spaces is filled with a character from the given set of distinct characters based on the given set of rules and given non-empty spaces in the set of spaces;
  a second or subsequent step of the solution-path comprises filling an empty space of the one or more empty spaces with a character from the given set of distinct characters based on the given rules, the given non-empty spaces in the set of spaces and a character filled in an empty space during one or more prior steps of the solution path;
  information relating to tracking the steps of solving the puzzle is maintained in or accessible to the computerized system, and,
  the method of associating the labels for parts of one or more solution-paths comprises the following actions:

(a) providing a sequence of labels, {Label(1), Label(2), Label(I), . . . } with a known sequential order;
(b) receiving a labeling algorithm for associating the labels with the filling of empty spaces in a solution-path, where Label(1) is associated with the first step of the solution-path, and each empty space filled at a second or subsequent step of the solution path is associated with a label based on the known sequential order of labels in the sequence of labels;
(c) receiving into a tangible medium or the computerized system, a first step of a first solution-path;
(d) receiving an association of Label(1) with the empty space filled at the first step of the first solution-path;
(e) recording the association of Label(1) with the empty space filled at said first step of the first solution-path;
(f) receiving by the tangible medium or the computerized system a next step in the first solution-path when said next step exists;
(g) receiving an association by said labeling algorithm of a label with the empty space filled at said next step;
(h) recording by the tangible medium or the computerized system, the label associated with the empty space filled at said next step;
(i) receiving by the tangible medium or the computerized system a first step of a next solution-path when said next solution-path exists;
(j) receiving an association of Label(1) with the empty space filled at said first step of said next solution-path;
(k) receiving by the tangible medium or the computerized system, a next step in said next solution-path when said next step exists;
(l) receiving an association by the labeling algorithm of a label with the empty space filled at said next step in said next solution-path;
(m) recording by the tangible medium or the computerized system the label associated with the empty space filled at said next step in said next solution-path;
(n) starting a computerized process on the computerized system to verify if label associations for the cells filled in one or more solution-paths are correct according to logical reasons of the labeling algorithm by checking each label for logical inconsistencies;
(o) receiving a determination from the computerized system if a label associated with filling a given empty space for any of said one or more solution-paths is inconsistent with: (i) a rule in the given set of rules, (ii) a given non-empty space in the set of spaces, or (iii) an empty space filled at any prior step of the solution-path;
(p) identifying from said one or more solution-paths, a first subset of the set of solution-paths for which no label associated with the filling of an empty space is inconsistent;
(q) identifying from said one or more solution-paths, a second subset, of the set of solution-paths for which at least one label associated with the filling of an empty space is inconsistent;
(r) recording in a first database, first information and data associated with each solution-path in the first subset, where the first information and data include the labels associated with the filling of its empty spaces;
(s) recording in a second database, second information and data associated with each solution-path in said second subset, wherein the second information and data include the labels associated with the filling of the corresponding empty spaces, and to save or isolate the solution-path for further processing or to mark it for removal;

(t) providing a sequence of ordered numerical values;
(u) assigning a numerical value from said sequence of ordered numerical values to each label in a sequence of labels for each of the one or more solution paths while maintaining correspondence of order between the sequence of ordered numerical values and the sequence of labels;
(v) receiving, for each of said one or more solution-paths in the first database, the numerical value assigned to each label associated with the filling of each empty space;
(w) receiving an algorithm for expressing in a tangible, virtual or computerized work of art, including visual or auditory modes of expression, the numerical values assigned to labels associated with filling the empty spaces in one or more parts of given set of spaces for one or more solution-paths in the first database;
(x) computing values by said algorithm for the labels associated with filling the empty spaces in said one or more parts of the set of spaces for one or more solution-paths in the first database; and
(y) creating a representation of the puzzle into a tangible, virtual or computerized artistic work, wherein creating the representation of the puzzle comprises representing the first information and data in the artistic work.

* * * * *